United States Patent
Strand

(10) Patent No.: US 9,778,737 B1
(45) Date of Patent: Oct. 3, 2017

(54) GAME RECOMMENDATIONS BASED ON GESTURE TYPE

(75) Inventor: William Alexander Strand, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1261 days.

(21) Appl. No.: 13/222,802

(22) Filed: Aug. 31, 2011

(51) Int. Cl.
 *A63F 9/24* (2006.01)
 *G06F 3/01* (2006.01)
 *A63F 13/22* (2014.01)

(52) U.S. Cl.
 CPC ............... *G06F 3/011* (2013.01); *A63F 13/22* (2014.09)

(58) Field of Classification Search
 CPC ........................................................ G06F 3/011
 USPC ........... 463/3, 16, 20, 35–37, 40; 273/138.1, 273/138.2, 139, 141 A, 141 R, 142 A, 273/142 B, 142 C, 142 H, 142 HA, 273/460–461; 345/475, 606; 472/15; 473/451–452; 482/1, 9, 54, 70, 78, 91, 482/121, 140; 725/38, 40, 133, 141, 153
 IPC .................................... G06F 19/00; G10G 1/04
 See application file for complete search history.

(56) References Cited

U.S. PATENT DOCUMENTS

| | | | |
|---|---|---|---|
| 6,142,876 A * | 11/2000 | Cumbers | 463/25 |
| 7,704,135 B2 * | 4/2010 | Harrison, Jr. | 463/7 |
| 7,843,429 B2 * | 11/2010 | Pryor | 345/158 |
| 8,298,087 B1 * | 10/2012 | Smith | 463/42 |
| 8,317,614 B2 * | 11/2012 | McCauley et al. | 463/37 |
| 2007/0259716 A1 * | 11/2007 | Mattice et al. | 463/36 |
| 2009/0075738 A1 * | 3/2009 | Pearce | 463/42 |
| 2009/0191968 A1 * | 7/2009 | Johnson et al. | 463/37 |
| 2009/0244309 A1 * | 10/2009 | Maison et al. | 348/222.1 |
| 2009/0258686 A1 * | 10/2009 | McCauley et al. | 463/7 |
| 2010/0113140 A1 * | 5/2010 | Kelly et al. | 463/25 |
| 2010/0306685 A1 * | 12/2010 | Giaimo et al. | 715/765 |
| 2011/0021272 A1 * | 1/2011 | Grant et al. | 463/30 |
| 2011/0173574 A1 * | 7/2011 | Clavin et al. | 715/863 |
| 2011/0306416 A1 * | 12/2011 | Kelly et al. | 463/31 |
| 2012/0007713 A1 * | 1/2012 | Nasiri et al. | 340/5.81 |
| 2013/0012279 A1 * | 1/2013 | McCauley et al. | 463/7 |

* cited by examiner

*Primary Examiner* — Reginald Renwick
(74) *Attorney, Agent, or Firm* — Thomas | Horstemeyer, LLP

(57) ABSTRACT

Disclosed are various embodiments for recommending games based on user ability. A computing device determines a gesture profile for an electronic game. The computing device generates, for a particular user, a recommendation about another electronic game. The recommendation is based at least in part on the gesture profile of the electronic game.

28 Claims, 3 Drawing Sheets

GAME RECOMMENDATIONS BASED ON GESTURE TYPE

BACKGROUND

Electronic games are now available on many different types of devices, with varying capabilities for user input. For example, some games may make heavy use of a joystick, while other games are suitable for play using a multi-touch device.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The various embodiments described herein relate to game recommendations based on game play behavior. Embodiments disclosed herein observe user interaction with multiple electronic games, and use the data collected during the observation to classify games into profiles based on the types of gestures made by users in playing the game. One game is then determined to be similar, or not similar, to another, based on similarity of these gesture profiles. After observing a target user playing a game fitting one profile, the embodiments disclosed herein can make a recommendation that the target user might be interested in another game which fits a similar gesture profile. The classification of a game into a gesture profile can be done a priori, or dynamically during the observation and gesture capture process. The recommendation can be provided to the target user in conjunction with an electronic commerce application. For example, a target user may be presented with a recommendation when that user browses the electronic game category of a network site which hosts the electronic commerce application. As another example, a target user may be presented with a recommendation when that user purchases, or selects for purchase, an electronic game. In the following discussion, a general description of the system and its components is provided, followed by a discussion of the operation of the same.

Figure 1:
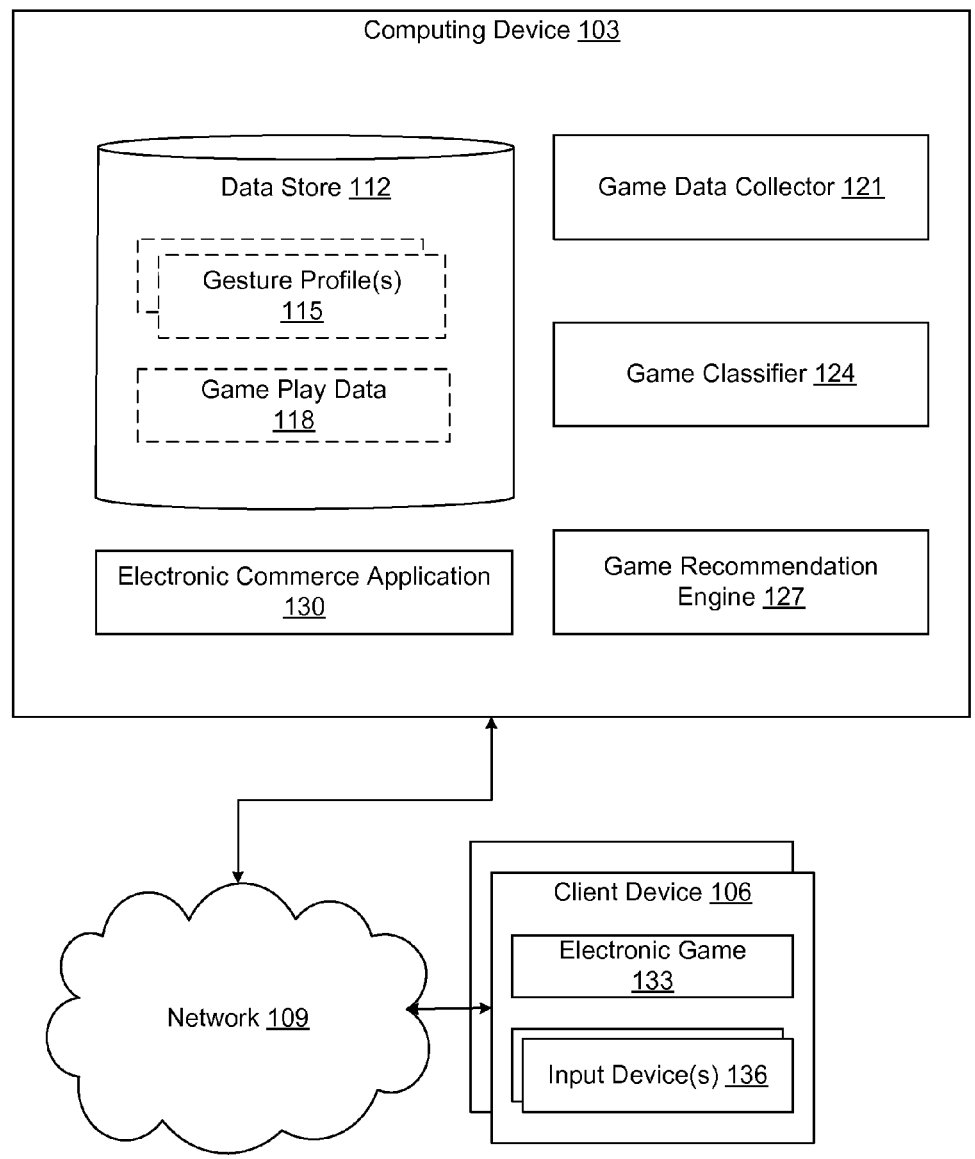
FIG. 1 is a drawing of a networked environment according to one embodiment of the present disclosure.

With reference to FIG. 1, shown is a networked environment 100 according to various embodiments. The networked environment 100 includes one or more computing devices 103 in data communication with one or more client devices 106 by way of a network 109. The network 109 includes, for example, the Internet, intranets, extranets, wide area networks (WANs), local area networks (LANs), wired networks, wireless networks, or other suitable networks, or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. A plurality of computing devices 103 together may comprise, for example, a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in various arrangements.

Various applications and/or other functionality may be executed in the computing device 103 according to various embodiments. Also, various data is stored in a data store 112 that is accessible to the computing device 103. The data store 112 may be representative of a plurality of data stores as can be appreciated. The data stored in the data store 112, for example, is associated with the operation of the various applications and/or functional entities described below. The data stored in the data store 112 includes, for example, gesture profiles 115, game play data 118 and potentially other data.

The components executed on the computing device 103 include, for example, a game data collector 121, a game classifier 124, a game recommendation engine 127, and an electronic commerce application 130. The components executed on the computing device 103 may also include other applications, services, processes, systems, engines, or functionality not discussed in detail herein. These components may communicate with each other using various mechanisms, including but not limited to any type of middleware framework. Though the game classifier 124 and the game data collector 121 are shown in FIG. 1 as being logically contained within the game recommendation engine 127, these components can be combined and/or distributed in various ways, as can be appreciated. In a similar manner, the electronic commerce application 130 may be integrated with the game classifier 124 or may be logically separate.

The game data collector 121 is executed to gather data as users play electronic games 133. The game play data 118 collected by the game data collector 121 describes user interaction with a particular electronic game 133, in terms of the gestures made by users while playing the electronic game 133. The game play data 118 collected by the game data collector 121 may also include other types of data, such as scores, session duration, etc. The game classifier 124 is operated to classify observed electronic games 133 into various gesture profiles 115. The gesture profiles 115 are derived from the game play data 118 collected by the game data collector 121, as will be explained in further detail below.

The game recommendation engine 127 is executed to generate a recommendation indicating that a target user may be interested in a particular electronic game 133. As will be explained in further detail below, the recommendation is based on similarity between one electronic game 133 that a user has already played (the "base game") and other electronic games 133 for which the game recommendation engine 127 has collected data ("observed games"). In particular, the similarity is measured in terms of the types of gestures that a user typically makes when playing these electronic games 133. Thus, a user who plays games fitting a particular gesture profile 115 is likely to be interested in other games fitting that same gesture profile 115.

The optional electronic commerce application 130, if present, is executed in order to facilitate the online viewing and/or purchase of items and products over the network 109. The electronic commerce application 130 also performs various backend functions associated with the online presence of a merchant in order to facilitate the online purchase of items, as should be appreciated. For example, the electronic commerce application 130 may generate network pages or portions thereof that are provided to client devices 106 for the purposes of selecting items for purchase, rental, download, lease, or other forms of consumption. In some embodiments, the electronic commerce application 130 is associated with a network site that implements an electronic marketplace in which multiple merchants participate.

Having discussed the computing device 103, the client device 106 will now be considered. The client device 106 is representative of a plurality of client devices that may be coupled to the network 109. The client device 106 may comprise, for example, a processor-based system such as a computer system. Such a computer system may be embodied in the form of a desktop computer, a laptop computer, a personal digital assistant, a cellular telephone, a smartphone, a set-top box, a television, a music player, a video player, a media player, a web pad, a tablet computer system, a game console, an electronic book reader, or other devices with like capability. The client device 106 may be configured to execute various applications such as an electronic game 133 and other applications.

The electronic game 133 may correspond to a first-person shooter game, an action game, an adventure game, a party game, a role-playing game, a simulation game, a strategy game, a vehicle simulation game, and/or other types of games. The electronic game 133 may designed for execution in a general-purpose computing device or in a specialized device such as, for example, a smartphone, a video game console, a handheld game device, an arcade game device, etc. The client device 106 may be configured to execute applications beyond the electronic game 133 such as, for example, email applications, messaging applications, and/or other applications.

The client device 106 may include one or more input devices 136. The input devices 136 may include, for example, devices such as a touchscreen, touch pad, touch stick, keyboard, mouse, joystick, game controller, push button, optical sensor, and/or any other device that can provide user input. Additionally, various input devices 136 may incorporate haptic technologies in order to provide feedback to the user.

A general description of the operation of the various components of the networked environment 100 is provided. To begin, one or more users plays one or more electronic games 133 on a client device 106. Game play involves users interacting with one or more input devices 136 on the client device 106. Some of these input devices 136 are capable of detecting user touch and movement and of generating gestures from touch, movement, or various combinations thereof. For example, a user device 136 may generate a gesture such as tap, a swipe, a pinch, or other gestures, as should be appreciated.

As the users play these electronic games 133, the game data collector 121 communicates with the client device 106 to collect gesture data and associate the stream of gestures with a particular game. After some amount of gesture data has been collected, the game classifier 124 uses the stored gesture data to determine a gesture profile 115 for one or more of the observed electronic games 133. The determination is based on the types of gestures a user makes when playing the game. For example, one electronic game 133 might use a mixture of taps and swipes, while another uses a mixture of taps and pinches. These two games might then be classified into different gesture profiles 115.

During game play, the game data collector 121 also collects data related to a user's skill at playing a particular electronic game 133. In this regard, the game play data 118 captured during a user session may include information about the user's score, the duration of play, and the number of sessions. This information can then be used to determine (directly or indirectly) a user's skill level for a particular game.

After collecting data for some number of electronic games 133, the game recommendation engine 127 may use this collected data to make a recommendation to a particular target user for an electronic game 133 based on similarity of gesture types. Thus, if the game play data 118 indicates that a target user has previously played an electronic game 133 that primarily uses a swipe gesture, the game recommendation engine 127 may recommend another electronic game 133 that fits a same, or similar, gesture profile 115. In some embodiments, the recommendation also takes into account the skill level of previously played games. Thus, for a target user who has played one swipe-tap-swipe game may receive a recommendation for another swipe-tap-swipe game when that user has shown above average skill at the previous swipe-tap-swipe game, but not when that user has shown below average skill for the swipe-tap-swipe profile.

The game recommendation engine 127 may execute in conjunction with the electronic commerce application 130, so that the recommendation is provided to the user, in the form of a network page, when the target user visits a network site associated with the electronic commerce application 130. Invocation of the game recommendation engine 127 may be conditional on various events. In one embodiment, a recommendation is made when a target user has played a predetermined number of different electronic games 133, or a predetermined number of sessions. In another embodiment, a recommendation is made when a target user has purchased, rented, or downloaded a predetermined number of different electronic games 133.

Figure 2:
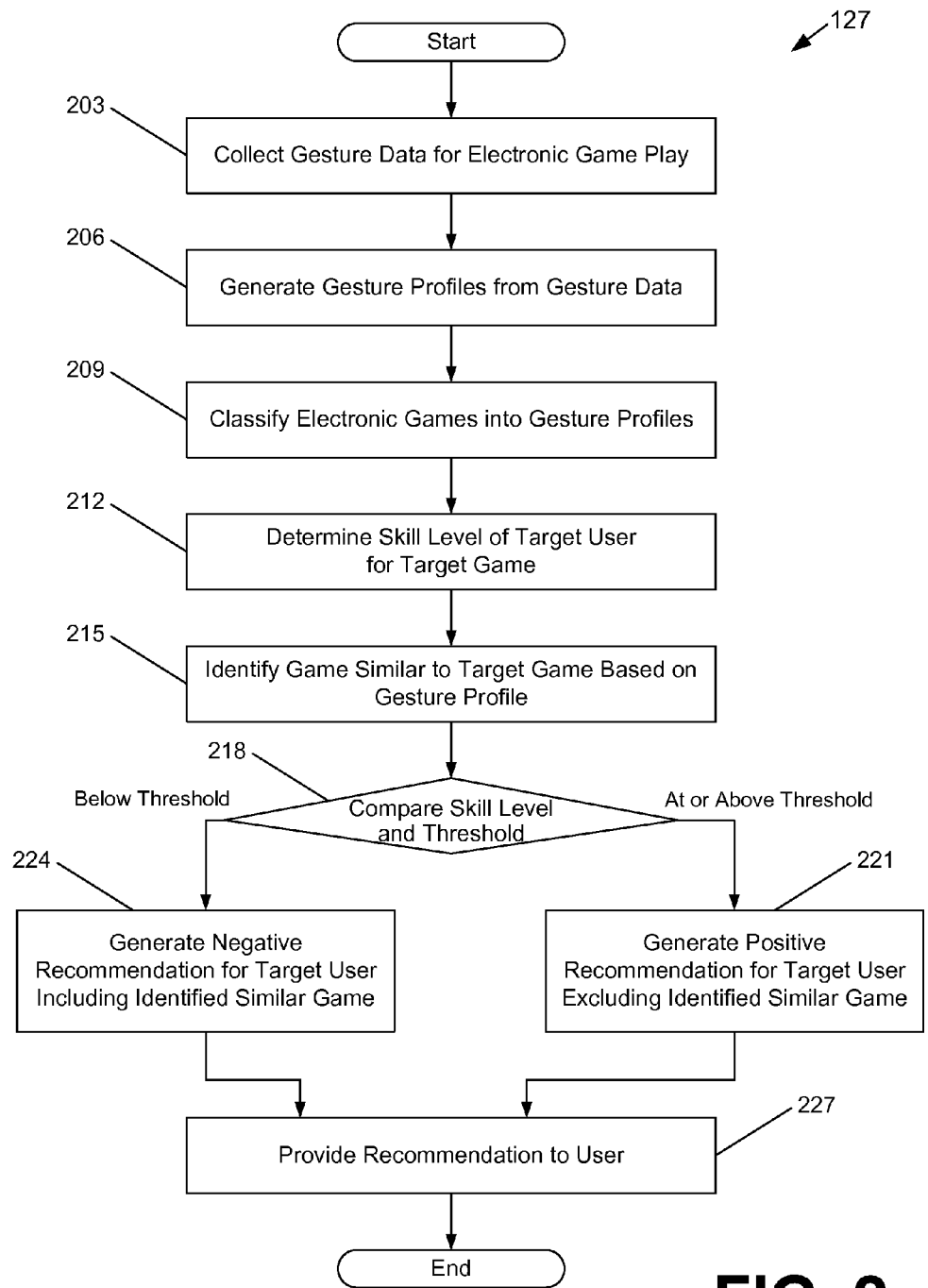
FIG. 2 is a flowchart illustrating an example of functionality implemented as portions of game recommendation code executed in a client device in the networked environment of FIG. 1 according to various embodiments of the present disclosure.

Turning now to FIG. 2, shown is a flowchart that provides one example of the operation of portion(s) of the game recommendation engine 127 according to various embodiments. It is understood that the flowchart of FIG. 2 provides merely an example of the many different types of functional arrangements that may be employed to implement the operation of portion(s) of the game recommendation engine 127 as described herein. As an alternative, the flowchart of FIG. 2 may be viewed as depicting an example of steps of a method implemented in the computing device 103 (FIG. 1) according to one or more embodiments.

Beginning at box 203, the game data collector 121 collects gesture data corresponding to gestures made by one or more users playing one or more electronic games 133 (FIG. 1) executing on one or more client devices 106 (FIG. 1). As described above, when a user plays an electronic game 133, the user input received and processed by the electronic game 133 may include gestures of various types (e.g., taps, swipes, pinches, etc.) This gesture data, including the gesture type, is captured by the game data collector 121 (FIG. 1). The gesture data is stored, for example, as game play data 118 (FIG. 1). The stored gesture data is at least associated with a particular game, and may further be instanced per user, per game, and/or per game session.

The gesture data may be reported in real-time, or substantially real-time, by the client device 106. Alternatively, the client device 106 may buffer the gesture data and provide the buffered data to the game data collector 121. The buffered data may be provided at the request of the game data collector 121, or the game data collector 121 may periodically push the buffered data to the game data collector 121. A number of mechanisms may be used on the client device 106 to capture the gesture data, for example, an application programming interface (API) provided by the operating system or an API provided by the hardware platform. In various embodiments, the client interface may capture all user input, all gestures, or gestures of specified types. If the client device 106 provides all user interface or all gestures, the game data collector 121 may filter the gesture data so that only gestures of specified types are stored in game play data 118.

Next, at box 206, the game classifier 124 (FIG. 1) generates a set of gesture profiles 115 (FIG. 1) from the gesture data. The gesture profiles 115 may be generated a priori, may be generated solely from user behavior, or a combination of the two. For example, the system may begin with a set of typical gesture profiles 115 that are created a priori, and then supplement the set with gesture profiles 115 created from gestures collected during game play. The gesture profile 115 may be represented in various ways, as should be appreciated. As one example, the gesture profiles 115 may correspond to a set of enumerated types (e.g., PrimarySwipe, SwipeAndTap, etc.). As another example, a gesture profile 115 may be described as having a primary gesture type and a secondary gesture type. As yet another example, a gesture profile 115 may encode the relative frequency of different gesture types.

At box 209, the game classifier 124 uses the stored gesture data to classify each game into a gesture profile 115, based on the types of gestures a user makes when playing the game. In this regard, the game classifier 124 examines the number of gestures of each type in order to assign a particular gesture profile 115 to a particular electronic game 133 (e.g., mostly uses the swipe gesture, uses a combination of swipe and tap, etc.). Although shown as separate boxes in FIG. 2, the process of generating gesture profiles 115 at box 206 may overlap with the gesture collection process of box 203.

The amount of gesture data used by the game classifier 124 to perform the classification may vary. Some embodiments may classify based on only a single session of the electronic game 133, played by a single user. Other embodiments may classify based on multiple sessions of the electronic game 133, played by a single user. Still other embodiments may classify based on play by different users. Still other embodiments may select a particular one of these classification methods depending on how much gesture data has been collected.

At this point, the data used to make a game recommendation for a particular target user has been gathered. The recommendation is based on data for a particular game, referred to herein as the "base" game. The set of games for which a gesture profile 115 has been developed are referred to herein as "observed games." Thus, the game recommendation engine 127 uses the gesture profile 115 of the base game to recommend one of the observed games having a similar gesture profile 115. In the embodiment described in connection with FIG. 2, the recommendation also takes into account the target user's skill level for the base game, but other embodiments do not.

At box 212, the game recommendation engine 127 determines a skill level of the target user in playing the base game. The game recommendation engine 127 makes this determination using game play data 118 corresponding to the base game and the target user. Various types of game play data 118 can be used to determine the skill level. In some embodiments, an application interface (API) provided by the base game is used to query scores for past sessions of the base game that were played by the user. The skill level is then based on these scores, for example, the last score, an average score, etc.

In other embodiments, the game play data 118 includes game session duration, and this duration is used as a proxy for the skill level. Thus, a player who played the game for thirty minutes is presumed to have a higher skill level than a player who played the same game for ten minutes. In still other embodiments, the number of sessions played by a user is used is used as a proxy for the skill level, so that a user who played twenty sessions is presumed to have a higher skill level than a player who played only five sessions.

A skill level may be normalized across different electronic game 133 to take into account differences between games. For example, a score of 100 may indicate excellent skill for one game but only poor skill for another. Similarly, a session duration of 10 minutes may suggest excellent skill for one game but only average skill for another.

Next, at box 215, the game recommendation engine 127 identifies an electronic game 133, from the observed set, having a gesture profile 115 that is similar to the gesture profile 115 of the base game. Similarity may be measured in various ways, as should be appreciated. In some embodiments, only games with the same gesture profile 115 are considered similar. In other embodiments, gesture profiles 115 may be assigned a numeric score, and profile scores within a specific range of each other are considered similar. In still other embodiments, gesture profiles 115 are ranked, and rankings within a specific range of each other are considered similar.

At box 218, the game recommendation engine 127 compares the target user's skill level for the base game to a predetermined threshold, in order to determine whether a positive or a negative recommendation is appropriate. If at box 218 it is determined that the skill level does meet the threshold, processing continues at block 221. On the other hand, if at box 218 it is determined that the skill level does not meet the threshold, then processing continues at block 224. While the embodiment in FIG. 2 provides both positive and negative recommendations, other embodiments may provide only one or the other. For example, an embodiment may ignore the case when the user's skill level is below the threshold.

At box 221, having determined that the target user's skill level for the base game meets the threshold, the game recommendation engine 127 generates a positive recommendation which specifically includes the electronic game 133 that was identified as similar to the base game in box 218. The recommendation may include game information such as title, manufacturer, version, and/or other suitable identifiers. Next, at box 227, the game recommendation engine 127 provides the generated recommendation to the target user. The process of FIG. 2 is then complete.

If, however, at box 218 it is determined that the target user's skill level for the base game does not meet the threshold, then at box 224 the game recommendation engine 127 generates a negative recommendation which specifically excludes the electronic game 133 that was identified as similar to the base game in box 218. Next, at box 227, the game recommendation engine 127 provides the generated recommendation to the target user. The process of FIG. 2 is then complete.

The recommendation may be delivered at box 224, for example, via email, text message, or any other suitable notification mechanism. The recommendation may also be provided through an electronic commerce network site. As one example, the recommendation may be provided when the target user visits the network site. As another example, the recommendation may be provided when the target user visits the network site and browses to the electronic games category. As yet another example, the recommendation may be provided the next time the target user visits the network site after purchasing, renting, and/or downloading an electronic game. Recommendations presented in the context of an electronic network site may take the form of a list of electronic games 133. As noted above, a negative recommendation specifically excludes the game that was identified in box 215 from the list, while a positive recommendation specifically includes the game. Gesture profile similarity is used to include or exclude one of the games 133 as described herein. However, the other games on the recommendations list may be selected based on other criteria, for example, the target user's past purchase or viewing history, the behavior of other customers, or various other criteria.

In some embodiments, the event which triggers the recommendation may be a game event. The triggering event may be, for example, a score or skill level event. For example, when a user reaches a predetermined score on a particular electronic game 133, that score event may trigger a positive recommendation for another electronic game 133 having a similar gesture profile 115. As another example, a skill level below a predetermined threshold may trigger a negative recommendation, and electronic games 133 with a similar gesture profile 115 may be excluded from a list of search results, or excluded from a list of similar electronic games 133.

Figure 3:
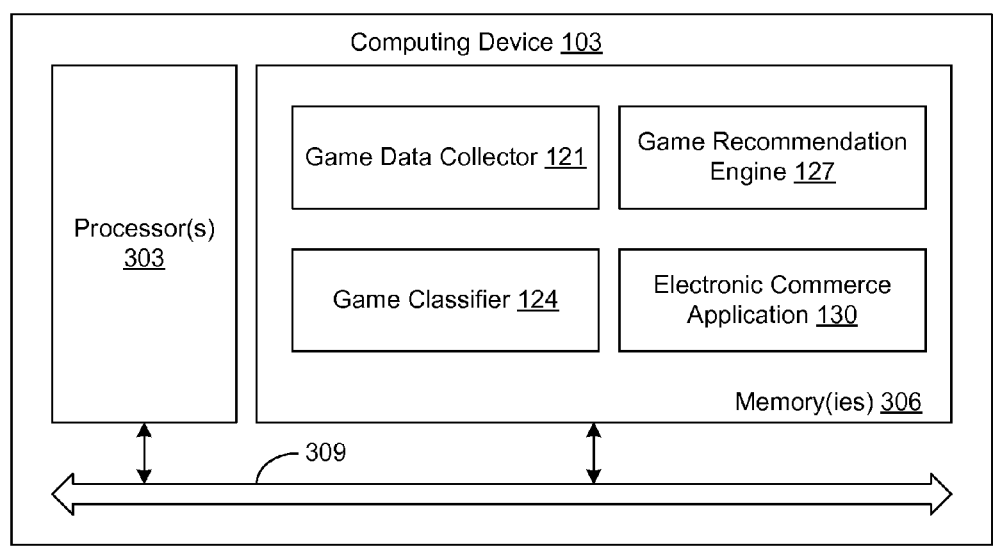
FIG. 3 is a schematic block diagram that provides one example illustration of a computing device employed in the networked environment of FIG. 1 according to various embodiments of the present disclosure.

Turning now to FIG. 3, shown is a schematic block diagram of the computing device 103 according to an embodiment of the present disclosure. The computing device 103 includes at least one processor circuit, for example, having a processor 303 and a memory 306, both of which are coupled to a local interface 309. To this end, the computing device 103 may comprise, for example, at least one server computer or like device. The local interface 309 may comprise, for example, a data bus with an accompanying address/control bus or other bus structure as can be appreciated.

Stored in the memory 306 are both data and several components that are executable by the processor 303. In particular, stored in the memory 306 and executable by the processor 303 are the game data collector 121, the game classifier 124, the game recommendation engine 127, and potentially other applications. In addition, an operating system may be stored in the memory 306 and executable by the processor 303. While not illustrated, the computing device 103 (FIG. 1) also includes components like those shown in FIG. 3, whereby the electronic game 133 (FIG. 1) is stored in a memory and executable by a processor.

It is understood that there may be other applications that are stored in the memory 306 and are executable by the processor 303 as can be appreciated. Where any component discussed herein is implemented in the form of software, any one of a number of programming languages may be employed such as, for example, C, C++, C#, Objective C, Java, JavaScript, Perl, PHP, Visual Basic, Python, Ruby, Delphi, Flash, or other programming languages.

A number of software components are stored in the memory 306 and are executable by the processor 303. In this respect, the term "executable" means a program file that is in a form that can ultimately be run by the processor 303. Examples of executable programs may be, for example, a compiled program that can be translated into machine code in a format that can be loaded into a random access portion of the memory 306 and executed by the processor 303, source code that may be expressed in proper format such as object code that is capable of being loaded into a random access portion of the memory 306 and executed by the processor 303, or source code that may be interpreted by another executable program to generate instructions in a random access portion of the memory 306 and executed by the processor 303, etc. An executable program may be stored in any portion or component of the memory 306 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 306 is defined herein as including both volatile and nonvolatile memory and data storage components. Volatile components are those that do not retain data values upon loss of power. Nonvolatile components are those that retain data upon a loss of power. Thus, the memory 306 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 303 may represent multiple processors and the memory 306 may represent multiple memories that operate in parallel processing circuits, respectively. In such a case, the local interface 309 may be an appropriate network 109 (FIG. 1) that facilitates communication between any two of the multiple processors 303, between any of the processors 303 and any of the memories 306, or between any two of the memories 306, etc. The local interface 309 may comprise additional systems designed to coordinate this communication, including, for example, performing load balancing. The processor 303 may be of electrical or of some other available construction.

Although the game data collector 121, the game classifier 124, the game recommendation engine 127, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 2 shows the functionality and operation of an implementation of portions of the game data collector 121, the game classifier 124, and the game recommendation engine 127. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as one of the processors 303 in a computer system or other system. The machine code may be converted from the source code, etc. If embodied in hardware, each block may represent a circuit or a number of interconnected circuits to implement the specified logical function(s).

Although the flowchart of FIG. 2 shows a specific order of execution, it is understood that the order of execution may differ from that which is depicted. For example, the order of execution of two or more blocks may be scrambled relative to the order shown. Also, two or more blocks shown in succession in the flowchart of FIG. 2 may be executed concurrently or with partial concurrence. Further, in some embodiments, one or more of the blocks shown in FIG. 2 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein (including the game data collector 121, the game classifier 124, and the game recommendation engine 127) that comprises software or code can be embodied in any non-transitory computer-readable medium for use by or in connection with an instruction execution system such as, for example, the processor 303 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:
    code that collects gesture data corresponding to play of a plurality of electronic games by a plurality of users, wherein the gesture data includes a plurality of gestures and each individual gestures have a respective gesture type;
    code that generates, from the collected gesture data, a plurality of gesture profiles;
    code that assigns one of the plurality of generated gesture profiles to individual electronic games based at least in part on the gesture types;
    code that compares the gesture profile of a target electronic game in the plurality of electronic games with corresponding gesture profiles of the remaining ones of the electronic games;
    code that determines a similar one of the remaining ones of the electronic games, the similar one determined by identifying whether a corresponding gesture profile of the similar one of the remaining ones contains a gesture type also contained in the gesture profile of the target electronic game;
    code that generates a recommendation including the similar one of the electronic games; and
    code that encodes, for rendering by a client device, at least one network page including the recommendation.

2. The non-transitory computer-readable medium of claim 1, wherein the gesture profile describes the electronic game as a combination of the gesture types.

3. The non-transitory computer-readable medium of claim 1, wherein the gesture profile describes the electronic game as a sequence of the gesture types.

4. The non-transitory computer-readable medium of claim 1, wherein the gesture type comprises a tap, a pinch, or a swipe.

5. The non-transitory computer-readable medium of claim 1, wherein the gesture type comprises an ordered series of gestures.

6. A method, comprising the steps of:
    comparing, by a computing device, a gesture profile of an electronic game with gesture profiles of a plurality of candidate electronic games, the plurality of candidate electronic games including the another electronic game; and
    generating, by the computing device, a recommendation for another electronic game based on a similarity between the gesture profile of the another electronic game and the gesture profile of the electronic game, the similarity determined by identifying whether the gesture profile of the another electronic game contains a same gesture type as the gesture profile of the electronic game.

7. The method of claim 6, wherein the recommendation is further based on a skill level of the user for the electronic game.

8. The method of claim 6, wherein the recommendation is a positive recommendation that specifically includes the another electronic game.

9. The method of claim 8, wherein the generating is conditional on a skill level of the user for the electronic game exceeding a predetermined threshold.

10. The method of claim 6, wherein the recommendation is a negative recommendation that specifically excludes the another electronic game.

11. The method of claim 10, wherein the generating is conditional on a skill level of the user for the electronic game falling under a predetermined threshold.

12. The method of claim 6, the determining comprising obtaining the gesture profile from stored data.

13. The method of claim 6, the method further comprising obtaining gesture data corresponding to the user playing the electronic game, and the determining comprising generating the gesture profile from the gesture data.

14. The method of claim 13, wherein the gesture data includes a plurality of gestures, each gesture having a respective gesture type, and the gesture profile is based at least in part on the gesture types.

15. The method of claim 13, wherein the gesture data includes a plurality of gestures, each gesture having a respective gesture type, and the gesture profile describes the electronic game as a combination of the gesture types.

16. The method of claim 13, wherein the gesture data includes a plurality of gestures, each gesture having a respective gesture type, and the gesture profile describes the electronic game as a sequence of the gesture types.

17. The method of claim 6, the method further comprising providing the recommendation to the user.

18. The method of claim 6, the method further comprising providing the recommendation to the user through an electronic commerce network site.

19. The method of claim 6, wherein the gesture type comprises a tap, a pinch, or a swipe.

20. The method of claim 6, wherein the gesture type comprises an ordered series of gestures.

21. A system, comprising:
   at least one computing device; and
   an application implemented in the at least one computing device, the application comprising:
   logic that compares a gesture profile of an electronic game with gesture profiles of a plurality of candidate electronic games, the plurality of candidate electronic games including the another electronic game; and
   logic that generates a recommendation for another electronic game based on a similarity between the gesture profile of the another electronic game and the gesture profile of the electronic game, the similarity determined by identifying whether the gesture profile of the another electronic game contains a same gesture type as the gesture profile of the electronic game.

22. The system of claim 21, the application further comprising:
   logic that collects gesture data corresponding to play of the electronic games;
   logic that generates a plurality of gesture profiles from the collected gesture data; and
   logic that assigns one of the plurality of generated gesture profiles to each at least one of the plurality of electronic games.

23. The system of claim 22, wherein the gesture data includes a plurality of gestures having a respective gesture type, and the gesture profiles are generated based at least in part on the gesture types.

24. The system of claim 21, the application further comprising:
   logic that collects gesture data corresponding to play of the electronic games; and
   logic that classifies at least one of the plurality of electronic games into one of the gesture profiles using the collected gesture data.

25. The system of claim 24, wherein the gesture data includes a plurality of gestures, each gesture having a respective gesture type, and the gesture profiles are classified based at least in part on the gesture types.

26. The system of claim 22, wherein the collected gesture data includes gesture data corresponding to play of at least one user other than the target user.

27. The system of claim 21, wherein the gesture type comprises a tap, a pinch, or a swipe.

28. The system of claim 21, wherein the gesture type comprises an ordered series of gestures.

* * * * *

UNITED STATES PATENT AND TRADEMARK OFFICE
CERTIFICATE OF CORRECTION

| | |
|---|---|
| PATENT NO. | : 9,778,737 B1 |
| APPLICATION NO. | : 13/222802 |
| DATED | : October 3, 2017 |
| INVENTOR(S) | : Strand et al. |

It is certified that error appears in the above-identified patent and that said Letters Patent is hereby corrected as shown below:

At Column 10, Line 58, in Claim 6, delete
"electronic games including the another electronic," and replace with
--electronic games including another electronic--
AND
At Column 11, Line 2, in Claim 7, delete
"further based on a skill level of the user for the electronic," and replace with
--further based on a skill level of a user for the electronic--
AND
At Column 11, Line 8, in Claim 9, delete
"conditional on a skill level of the user for the electronic," and replace with
--conditional on a skill level of a user for the electronic--
AND
At Column 11, Line 14, in Claim 11, delete
"conditional on a skill level of the user for the electronic," and replace with
--conditional on a skill level of a user for the electronic--
AND
At Column 11, Line 19, in Claim 13, delete
"obtaining gesture data corresponding to the user playing the," and replace with
--obtaining gesture data corresponding to a user playing the--
AND
At Column 11, Line 35, in Claim 17, delete
"providing the recommendation to the user.," and replace with
--providing the recommendation to a user.--

Signed and Sealed this
Sixth Day of March, 2018

Andrei Iancu
*Director of the United States Patent and Trademark Office*